No. 671,549. Patented Apr. 9, 1901.
F. E. HALL.
ELASTIC TIRE FOR VEHICLES.
(Application filed Mar. 14, 1899. Renewed Mar, 12, 1901.)
(No Model.)
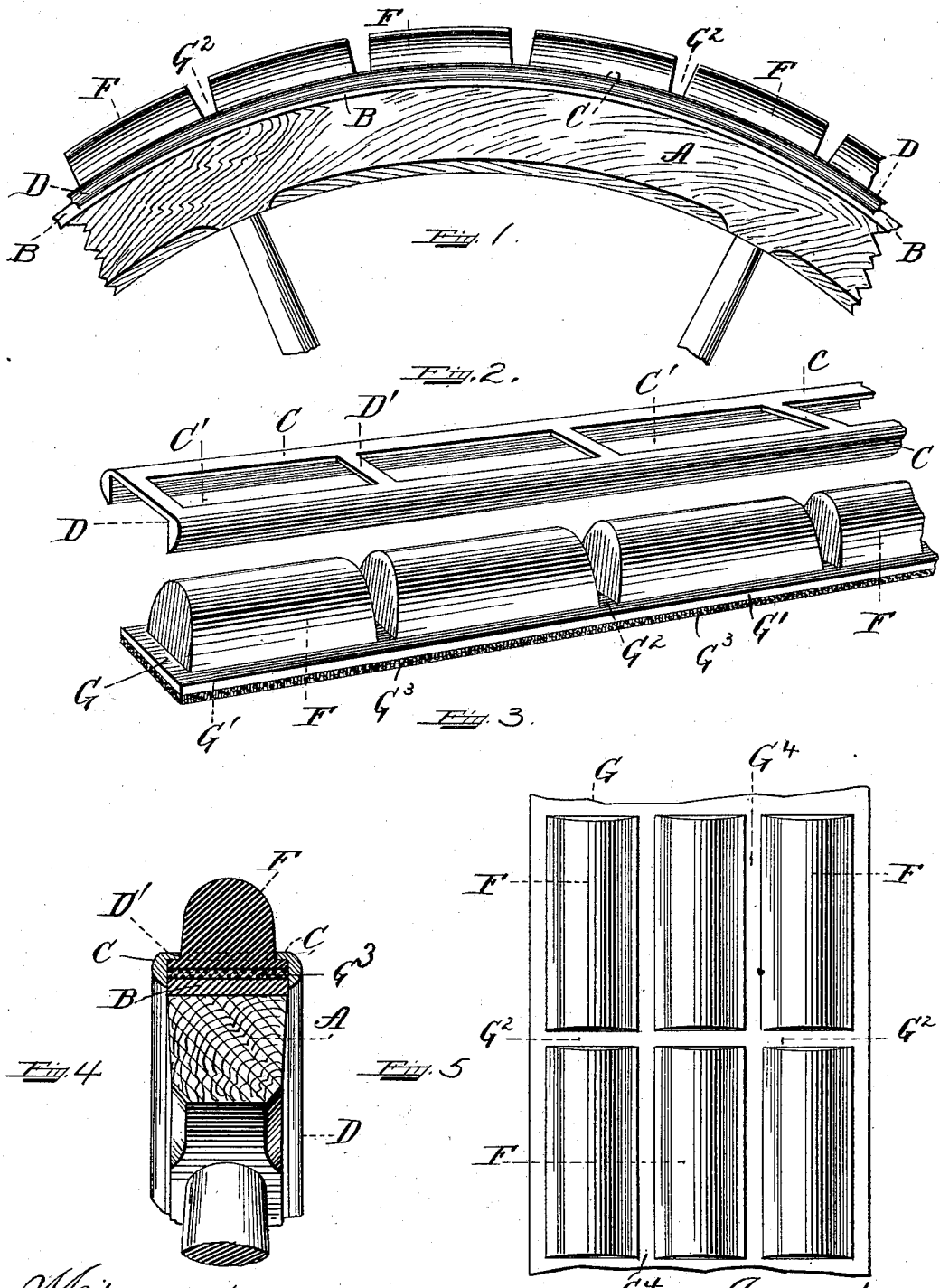

UNITED STATES PATENT OFFICE.

FRANK E. HALL, OF QUINCY, MASSACHUSETTS.

ELASTIC TIRE FOR VEHICLES.

SPECIFICATION forming part of Letters Patent No. 671,549, dated April 9, 1901.

Application filed March 14, 1899. Renewed March 12, 1901. Serial No. 50,855. (No model.)

*To all whom it may concern:*

Be it known that I, FRANK E. HALL, of Quincy, in the county of Norfolk and State of Massachusetts, have invented certain new and useful Improvements in Elastic Tires for Vehicles, of which the following is a specification.

My invention relates to new and useful improvements in elastic tires, and is in the nature of an improvement of the tire disclosed in United States patent issued to me on May 17, 1898, No. 604,042.

The object of my invention is the production of a more practical form of tire and to avoid defects and objectionable features in the well-known continuous rubber tire and also in the tire shown in my said patent. For instance, in the continuous rubber tire in turning a corner there is a tendency to roll the tire off the channel of the wheel, as the tire, being in one continuous base with an unbroken periphery, does not give as it would if the periphery of the tire were made in separate pieces, because the material onto which the wheel is advancing is turned out of its normal position by the part resting on the ground being turned out of its position by the weight of the carriage.

In a continuous tire the carriage vibrates by the unevenness of the ground and by horse motion. The tire having a continuous periphery continually imparts its vibration to that part of the rubber next approaching the ground, because said rubber having a continuous periphery there is no way in which the tire can expand and compress without affecting the rubber ahead of it and continually imparting vibration to the carriage.

The tire disclosed in my patent previously mentioned is made up of a series of sections of independent rubber, which in practice in getting them close together or in touching leaves a very small flange to prevent the rubbers from pulling out of the perforated tire-holder or clamping-band. Therefore to meet the objections to the continuous tire previously mentioned and to the independent rubbers I have devised and constructed a tire, hereinafter more fully explained, wherein it is provided that the base of the tire may be continuous and the periphery made in sections, with spaces between sections of the periphery. This base may be made continuous around the wheel or may be made up with two or more wearing rubber sections for each base-section, with the base connected and held down by very narrow cross-pieces, so that the knobs could not pull out, as they would be connected under the cross-piece. By making the tire in this manner with two or more joined sections the spaces between the sections of the periphery are reduced, thereby bringing the peripheries of the tire very close together, but not making a continuous tire.

In a tire of the construction disclosed in this application the vibration previously described as taking place in a continuous tire is avoided, because only one to three sections rest on the ground at one time, and after vibrating the wearing-surface passes to sections of rubber that have not had this vibration imparted to them by the preceding rubber on account of the space between them in the periphery which cuts off the vibration.

My invention consists of certain novel features hereinafter described, and particularly pointed out in the claims.

In the accompanying drawings, which illustrate a construction embodying my invention, Figure 1 is a side view of a portion of a wheel with my improved tire attached thereto. Fig. 2 is a perspective view of a portion of the tire-holder. Fig. 3 is a perspective view of a section of the tire. Fig. 4 is a section of the rim and tire, taken on the line X X, Fig. 1. Fig. 5 is a plan view of a section of a tire adapted for heavy work and showing a series of transversely and longitudinally located independent rubber wearing-sections.

Like letters of reference refer to like parts throughout the several views.

Around the felly A of the wheel is located the usual tire B, which is shrunk or otherwise secured to the felly. Upon the iron tire B is located the elastic tire G, having the reinforced base G' and having end and side flanges, and said tire G is held in place on the tire B by the clamping-band C, provided with downwardly-extending flanges D, adapted when the bars are in place to embrace the sides or edges of the tire B, and the cross-pieces D' of the band C pass into the spaces $G^2$, between the sections F of the tire, which project up through the opening C' in the clamping-band C.

In preparing the rubber tire G the sections of the periphery are first made up separately. Then they are placed in each cavity of the mold. The base G' being reinforced throughout its entire width and length by canvas $G^3$ or cotton-duck or other suitable fabric material to make it rigid is then placed on top of the bottom of the sections, and the mold being brought together presses the base onto the sections and vulcanizes them together. The object of a continuous base is to make the tire very much stronger and to make it impossible to pull the sections up through the perforated clamping-band. It also allows for making the cross-pieces of the clamping-band much narrower. With these narrow cross-pieces if the sections were made separately the flanges would not be wide enough to prevent them from pulling up through the clamping-band. The bringing of the adjacent edges of the sections closer together (giving the appearance of a continuous wearing-surface to the tire) does away with the vibration of a tire having an unbroken periphery. In an ordinary-sized wheel four or five sections of the base of this continuous tire are used, or it may be made in one continuous strip.

Fig. 5 is a plan of a section of a tire for heavy work and shows a broad base G, capable of carrying two or more wearing-sections F in width as well as longitudinally. The object in having two or three transverse strips is to distribute the weight of the vehicle on the full width of the tire, whereas if there is but one large rubber there is but one bearing-point. If three strips of rubber are used, there are three bearing-points. In this construction the clamping-band C is provided with longitudinal pieces, which fit into the longitudinal spaces $G^4$ between the sections, as well as with the transverse cross-pieces D', which fit into the spaces $G^2$.

The advantage of having a common base for all the sections or any series of the rubber sections is to get the sections closer together, and the benefit of this is to get more rubber in the width and length of the tire.

In the construction of the tire there is used a fabric either of cotton, silk, or a similar material, which material being woven allows the rubber compound during vulcanization to pass through and around the fibers of the fabric, making the fabric integral with the rubber, thereby stiffening the base of the tire, so that it cannot be pulled out through the apertures of the steel tire-holder, and the fabric will not separate from the upper portion of the base. The object of using fabric instead of metal is to more effectually unite the rubber through the meshes of the fabric and make a more solid integral mass than can be done by having perforations through a metal reinforcing-plate, as the rubber compound will not adhere to metal as strongly as to fabric material.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In a tire for vehicles, a series of wearing rubber sections, a base for said series provided with side flanges extending beyond the sections with continuous end flanges between each two contiguous wearing rubber sections and adapted to rest upon the periphery of a wheel, a fabric material vulcanized to the base throughout its length and width and integral therewith for reinforcing and stiffening the same, and a clamping-band adapted to be placed over said base and having side bars with flanges which respectively engage the side flanges of the base and the side edges of the wheel and provided with cross-bars each of which bears on the continuous end flanges between each two contiguous wearing rubber sections.

2. In a tire for vehicles, a series of wearing rubber sections, a base for said series provided with side flanges extending beyond the sections with continuous end flanges between each two contiguous wearing rubber sections and adapted to rest upon the periphery of a wheel, a fabric material vulcanized to the base throughout its length and width and integral therewith for reinforcing and stiffening the same, and a clamping-band adapted to be placed over said base and to engage the side flanges of the base and the side edges of the wheel and the end flanges between each two contiguous wearing rubber sections.

In testimony whereof I have signed my name to this specification, in the presence of two subscribing witnesses, this 7th day of March, A. D. 1899.

FRANK E. HALL.

Witnesses:
C. A. STEWART,
A. L. MESSER.